May 31, 1927.  
C. W. SPEIRS  
1,630,587  
KILN AND OTHER HEAT TREATMENT FURNACE  
Filed Jan. 21, 1926  9 Sheets-Sheet 1

Inventor:  
Charles W. Speirs  
By George A. Prevost  
atty.

May 31, 1927.

C. W. SPEIRS 1,630,587

KILN AND OTHER HEAT TREATMENT FURNACE

Filed Jan. 21, 1926

Inventor:
Charles W. Speirs
By George A. Prevost
atty.

May 31, 1927.

C. W. SPEIRS 1,630,587

KILN AND OTHER HEAT TREATMENT FURNACE

Filed Jan. 21, 1926

Inventor.
Charles W. Speirs
By George A. Prevost
atty.

May 31, 1927.

C. W. SPEIRS 1,630,587

KILN AND OTHER HEAT TREATMENT FURNACE

Filed Jan. 21, 1926    9 Sheets-Sheet 5

Inventor.
Charles W. Speirs
By George A. Privott
atty.

C. W. SPEIRS

1,630,587

KILN AND OTHER HEAT TREATMENT FURNACE

Filed Jan. 21, 1926

Patented May 31, 1927.

1,630,587

UNITED STATES PATENT OFFICE.

CHARLES WILLIAM SPEIRS, OF BATTERSEA, LONDON, ENGLAND, ASSIGNOR TO MORGAN CRUCIBLE COMPANY LIMITED, OF BATTERSEA, LONDON, ENGLAND.

KILN AND OTHER HEAT-TREATMENT FURNACE.

Application filed January 21, 1926, Serial No. 82,749, and in Great Britain September 9, 1925.

This invention relates to kilns, such as are used for glazing pottery, but which are also applicable for other purposes, as, for example, annealing metals, bottles, artificial teeth and, generally, for similar types of heat treatment and chemical processes.

As is well known, the usual type of pottery kiln is heated by the combustion of coal, gas or oil and consists either of a large circular chamber of considerable height, or, is in the form of a tunnel along which trucks carry the ware. In both cases, light and fragile ware, such as cups and saucers, must be encased in saggers to protect the ware from the products of combustion and also to enable it to be held in position in the kiln.

As such kilns are of large mass and contain a quantity of saggers much in excess of the ware to be burnt, considerable time and fuel are required to attain the temperature necessary to melt the glaze, and a correspondingly long time is also incurred in cooling down. The time and temperature curve is therefore fixed within fairly definite limits according to the size of the kiln.

It is found by experiment that a considerable improvement can be effected in the glaze by taking the article quickly to a high temperature and cooling again as quickly as possible, the time under heat being limited only by the power of the ware to resist cracking due to too sudden changes in temperature.

Thicker coatings of glaze can be used by this means than is possible when the ware is held at a high temperature for a long time, and the colouring under the glaze is sharper and clearer for the same reason. It is found that it is more economical to use a higher temperature and a shorter firing time. Radiation losses are only slightly increased at the higher temperature, whilst due to increased output all other costs are reduced and generally the quality of product is improved.

The invention, therefore, has for its object an improved kiln in which the time of firing is materially reduced and in which no saggers are required and no smoke or products of combustion are generated which can injure the ware or goods under treatment.

To this end, according to the invention, a tunnel kiln is constructed, the firing zone of which is heated by a resistor or resistance made preferably in accordance with the specification of British Patent No. 225,608, and United States Patent No. 1,528,388, which is heated electrically to a very high temperature by the passage of current therethrough. The said resistor may be any convenient shape adapted to particular requirements, and is so arranged that the ware or goods to be heated can be brought as near as possible to the source of heat without actually making contact.

The heat generated by the current flowing through the resistor may be regulated as required, either by controlling the power input, or the rate of travel of the ware or goods through the kiln, and an even temperature can be maintained over the whole hot zone for any reasonable period of time.

In practice, it has been found most convenient to use a flat resistor plate for firing articles such as cups, or flat trays containing small articles, chemicals etc., or metal strips. In this case only the roof of the kiln hot zone is heated. For firing plates and saucers and larger and more solid articles, it has been found more economical to arrange the resistor in a vertical position in the centre of the tunnel, whilst for a few special purposes, a resistor of horse-shoe cross section, being a circle from which a segment is cut to allow the passage of the supporting truck, has proved most economical.

Terminal rods of graphite enclosed in glazed sleeves of refractory material to prevent oxidation, extend from suitable points in the resistor through the roof of the kiln, their projecting ends being fitted with nichrome terminals to which are attached leads from the source of electrical supply. The charge is introduced into and passed through the kiln on a truck, trolley, or by making the kilns of circular endless form, on revolving annular tables, and the travel of the said charge may be continuous and at such a rate that the firing of the goods is effected during their passage through the firing chamber.

In order still further to effect economy, I may provide any convenient means for utilizing the heat radiated from the cooling goods to pre-heat the cold goods entering the kiln.

In practice, it has been found, when working with this electric kiln on a commercial scale, that the total heat required for raising the temperature of any articles from atmospheric temperature to, say, glazing temperature, is a definite number of heat units, which can be easily translated into electric units; but this forms only a small part of the energy necessary to work the kiln, the remainder of the energy being lost in radiation.

This radiation loss can, however, be counterbalanced by the use of a cheaper form of heat energy than that produced electrically and for this purpose, hot-water pipes, steam pipes, or flues for combustion gases may be employed.

It will thus be seen that the high temperature zone is maintained entirely by electrical energy expended close to the ware in the most economical position, a clean source of heat, that is to say, with no dust or harmful gases and a temperature that is easily regulated to a very accurate degree, whilst for the radiation loss the forms of heat suggested may be used.

The kiln can, if required, can be made air-tight and if suitable double doors are fitted at both ends, the ware to be heated can be maintained in a reducing atmosphere, this condition is required for carbon brushes and graphite crucibles and is difficult to obtain with ordinary kilns.

To enable the invention to be fully understood I will describe it by reference to the accompanying drawings, in which:—

Figure 19 is a temperature chart hereinafter referred to.

$a$, Figures 1 to 9, is the tunnel kiln through which are traversed the trucks or trolleys $b$ supporting the ware or goods to be treated. $c$ is the electric resistor, more than one of which may be employed, which is preferably made in accordance with the specification of the British Patent No. 225,608 and United States Patent No. 1,528,388 and is of a shape designed to apply to the best advantage the heat generated in the resistor to the goods to be heated. For instance, in the construction of kiln illustrated in Figures 1 to 4, and Figure 9, the resistor $c$ is in the form of a flat plate and forms a horizontal roof of the tunnel, the goods to be heated being arranged on the horizontal trays or tables $d$ of the trucks or trolleys $b$ so as to be brought into close proximity to the underside of the said plate, the travel of the trucks being continuous and at such a rate that the firing of the goods is effected during their passage past the resistor.

Figure 1:
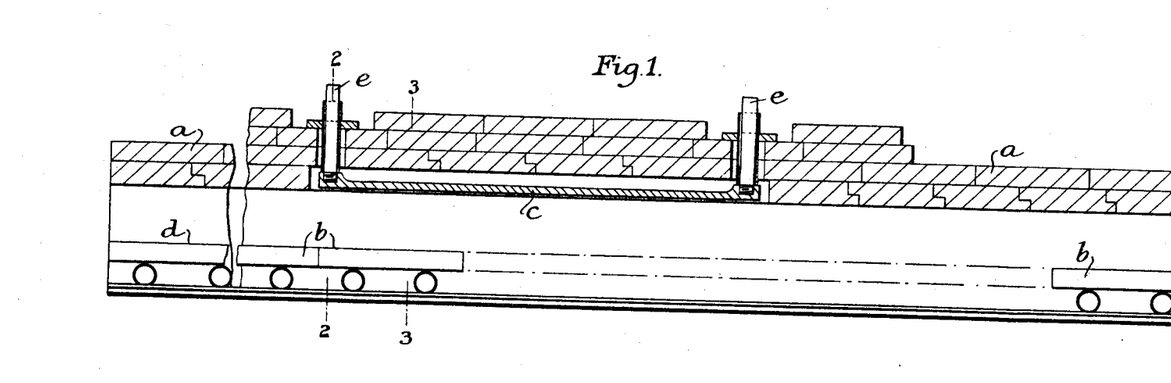
Figure 1 is a longitudinal section of a tunnel pottery kiln constructed in accordance with the invention and employing a flat resistor arranged horizontally.
Figure 2:
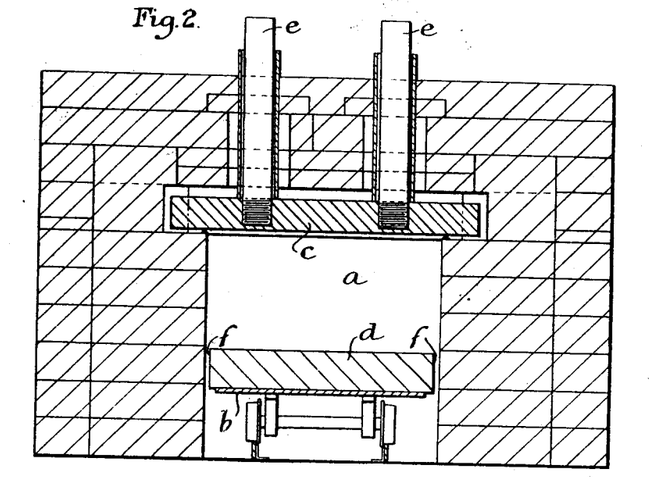
Figures 2 and 3 are, respectively, sections on the lines 2—2 and 3—3, Figure 1, but drawn to a larger scale than the latter figure.
Figure 3:
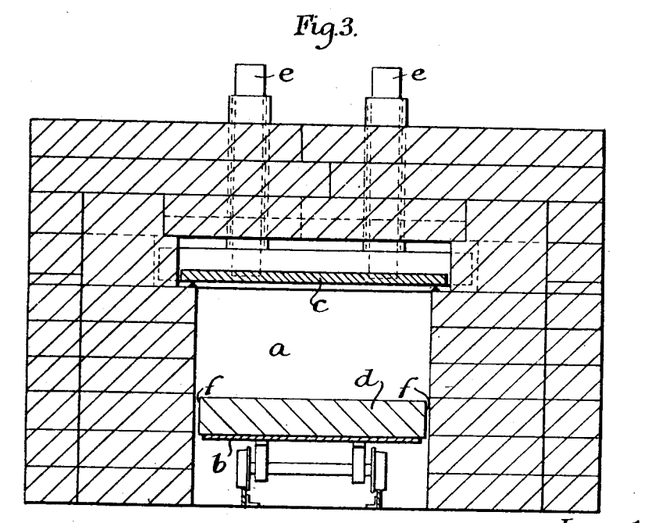
Figure 4:
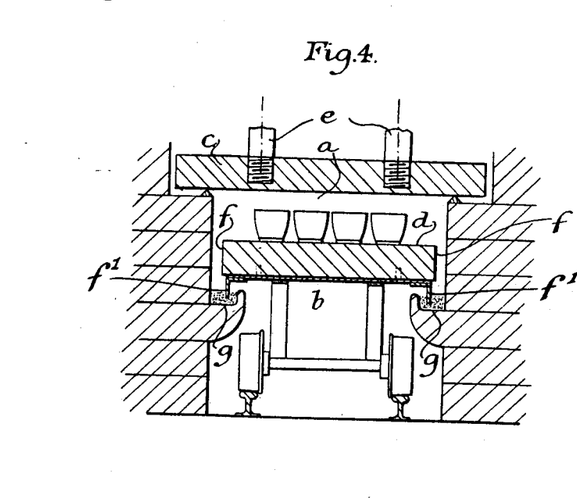
Figure 4 is a view similar to Figure 2, illustrating a slight modification.
Figure 5:
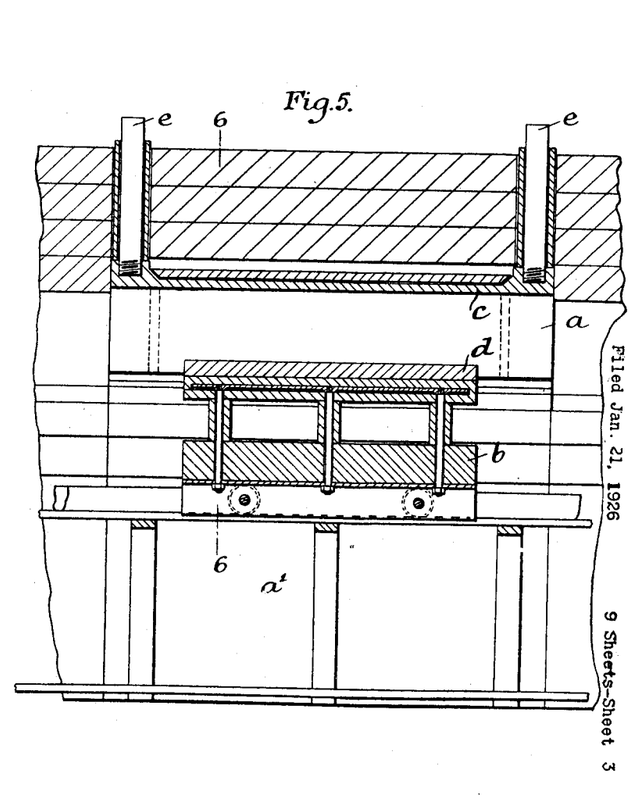
Figure 5 is a longitudinal section of another modification of the kiln using a resistor of horse-shoe section.
Figure 6:
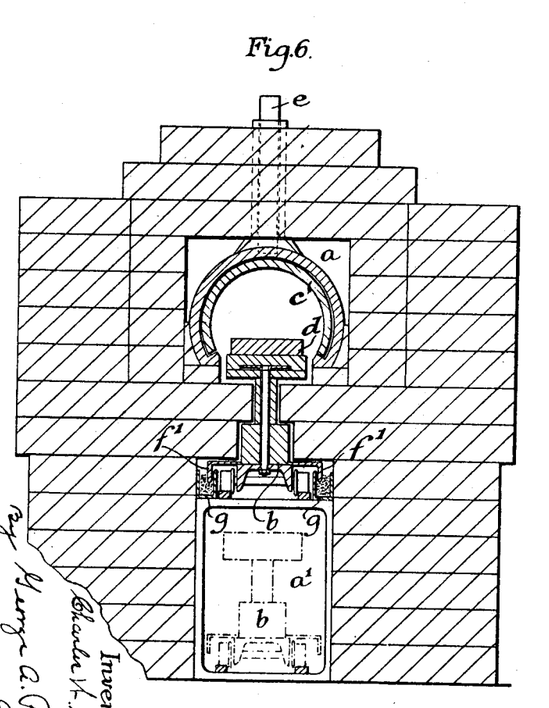
Figure 6 is a section on the line 6—6, Figure 5.

In the construction illustrated in Figures 5 and 6, the resistor $c$ is of horse-shoe form in cross section so as to extend over and down on both sides of the goods stacked on the trucks or trolleys $b$, a segment of the resistor being removed to allow of the passage of the said trucks or trolleys.

Figure 7:
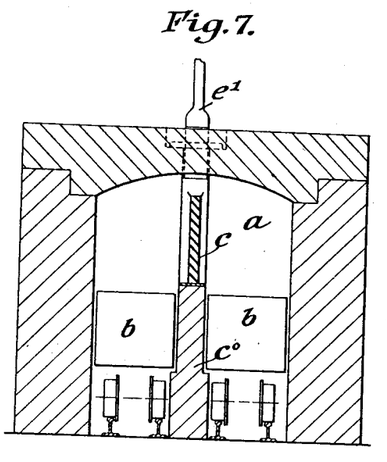
Figure 7 is a cross section of a tunnel kiln in which the resistor is mounted vertically in the centre of the tunnel.
Figure 8:
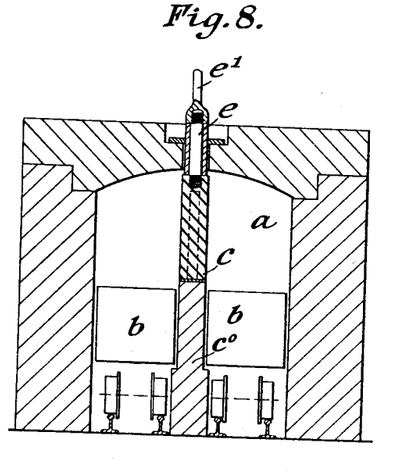
Figure 8 is a similar view to Figure 7, but with the section taken in a plane passing through one of the terminals of the resistor.

In Figures 7 and 8, the resistor $c$ is arranged vertically and centrally between the walls of the tunnel, so as to divide the latter into two parts, each designed to accommodate a line of trucks. The resistor is supported upon a division wall $c^0$.

Figure 9:
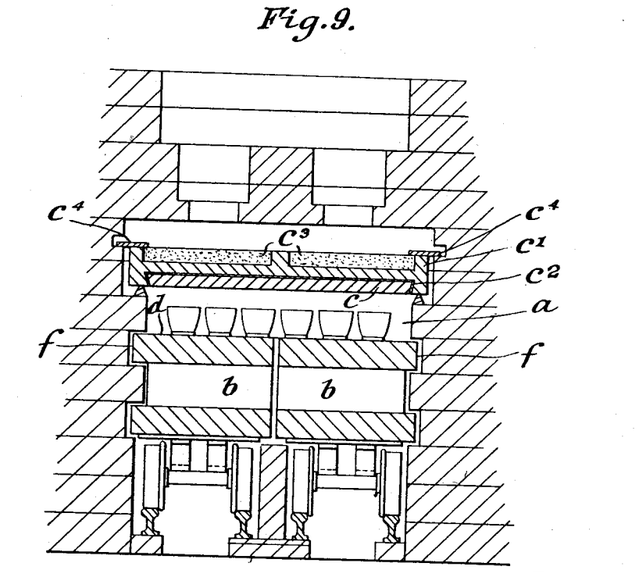
Figure 9 is a transverse section illustrating another modification of the kiln with a horizontal resistor.
Figure 10:
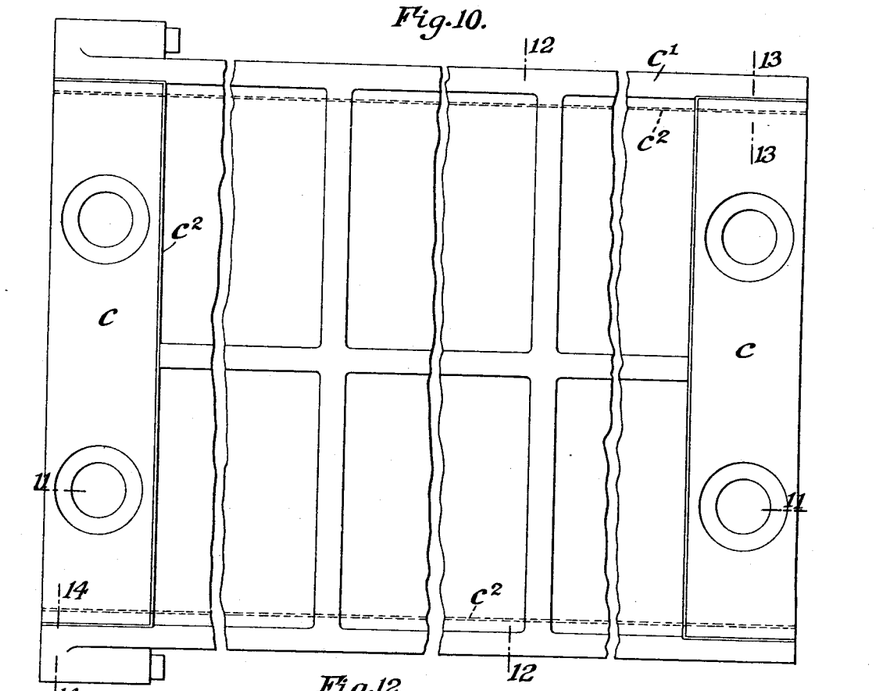
Figure 10 is a plan view of th resistor illustrated in Figure 9, but drawn to a larger scale than the latter figure.
Figure 11:
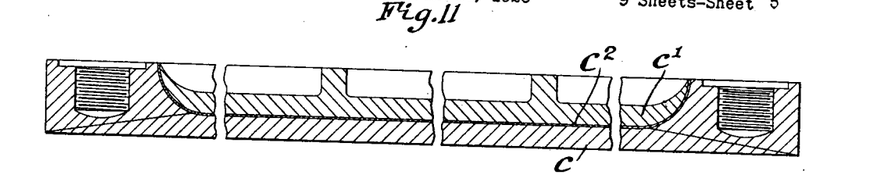
Figures 11, 12, 13 and 14 are, respectively, sections on the lines 11—11, 12—12, 13—13 and 14—14, Figure 10.
Figures 12, 13, 14:
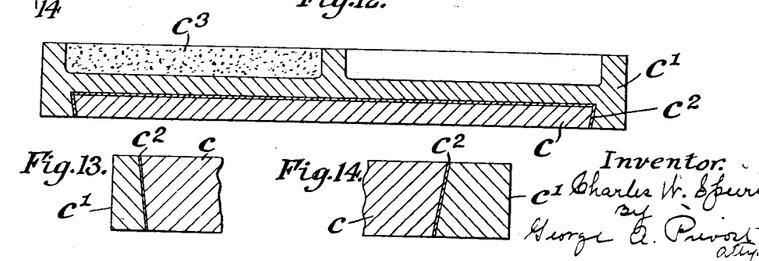

In Figure 9, which illustrates a tunnel similar to that illustrated in Figures 7 and 8 but with a horizontal resistor, the said resistor $c$ is supported in a refractory case $c^1$ from which it is insulated by an insulating layer $c^2$ thus allowing a greater width of tunnel. The said supporting case $c^1$ is so constructed, as illustrated clearly in Figures 10 to 14 that very refractory insulating powder $c^3$ can be carried directly above the resistor and thus conserve the heat. Slabs $c^4$, Figure 9, prevent eddy currents of air carrying away heat.

Figure 15:
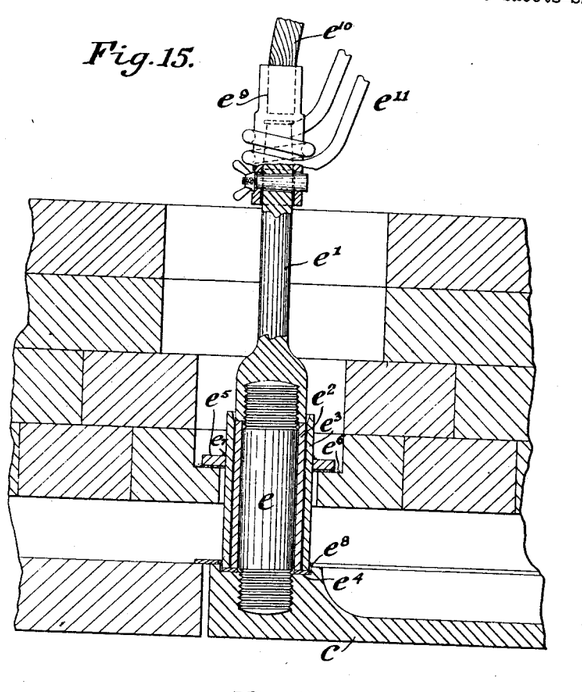
Figure 15 is a sectional elevation illustrating a complete terminal for use with the resistors employed.

The electric current is conveyed to the resistor $c$, or each resistor, by graphite rods $e$ screwed into the resistor and metal terminals $e^1$ screwed to the rods $e$, see Figure 15, $e^2$, $e^3$ being a pair of sleeves of glazed refractory material which fit around each rod $e$. These sleeves fit into a recess in the resistor plate $c$, and are bedded on a wad of plastic clay $e^4$ and are of such a length that the terminal $e^1$, which is preferably made of nichrome, when screwed home on the top of the rod $e$ also makes close contact with the top of the inner sleeve $e^2$. The object of the wad of plastic clay is to prevent the expansion of the inner sleeve, during the heating up of the furnace, breaking the graphite rod $e$ and to form a base for glaze that is painted round all joints. $e^5$ is a ring of refractory clay fitting around the outer sleeve $e^3$ and bedded on sand $e^6$. Glazes $e^7$ and $e^8$ of suitable melting points are used for the joints at top and bottom of the sleeves $e^2$, $e^3$, respectively, so that under working conditions the glaze is in a semi-molten condition and therefore excludes all air. The two sleeves $e^2$, $e^3$ may be made in the form of a single unit. $e^9$ is the connector for the lead $e^{10}$ to the terminal $e^1$, the said connector being cooled by means of the water pipe $e^{11}$, or it may be air-cooled.

In order to protect the under-carriage and wheels of the trucks $b$ from the heat generated by the resistors $c$ the tables or supports $d$ for the goods to be heated are made of refractory material of considerable depth with the side edges $f$ in close proximity to the side walls of the tunnel $a$. In addition, the under surface of each table or support $d$ at each side, may be provided with a metal web $f^1$, Figures 4 and 6, depending into a trough $g$ on the wall of the tunnel containing sand or the like so as to form a seal.

In the construction illustrated in Figures 5 and 6 the kiln is formed with an additional or return tunnel $a^1$ below the main tunnel $a$ and serving for the return of the trucks $b$ to the starting point after the discharge of their loads of treated goods, in order that they can be again loaded and passed through the tunnel $a$.

The kiln can be arranged for a single line of trucks as in Figures 1 to 6; or the goods can be carried by two lines of trucks, as illustrated in Figures 7, 8 and 9, in which two series of trucks $b$ carrying the goods to be heated run in opposite directions, so that the heat radiated from the goods passing away from the resistor on one series of trucks, is imparted to the goods passing to the resistor on the other series of trucks, whereby economy of electric current results owing to the high degree of heat possessed by the goods when arriving at the resistor.

Figures 16, 17:
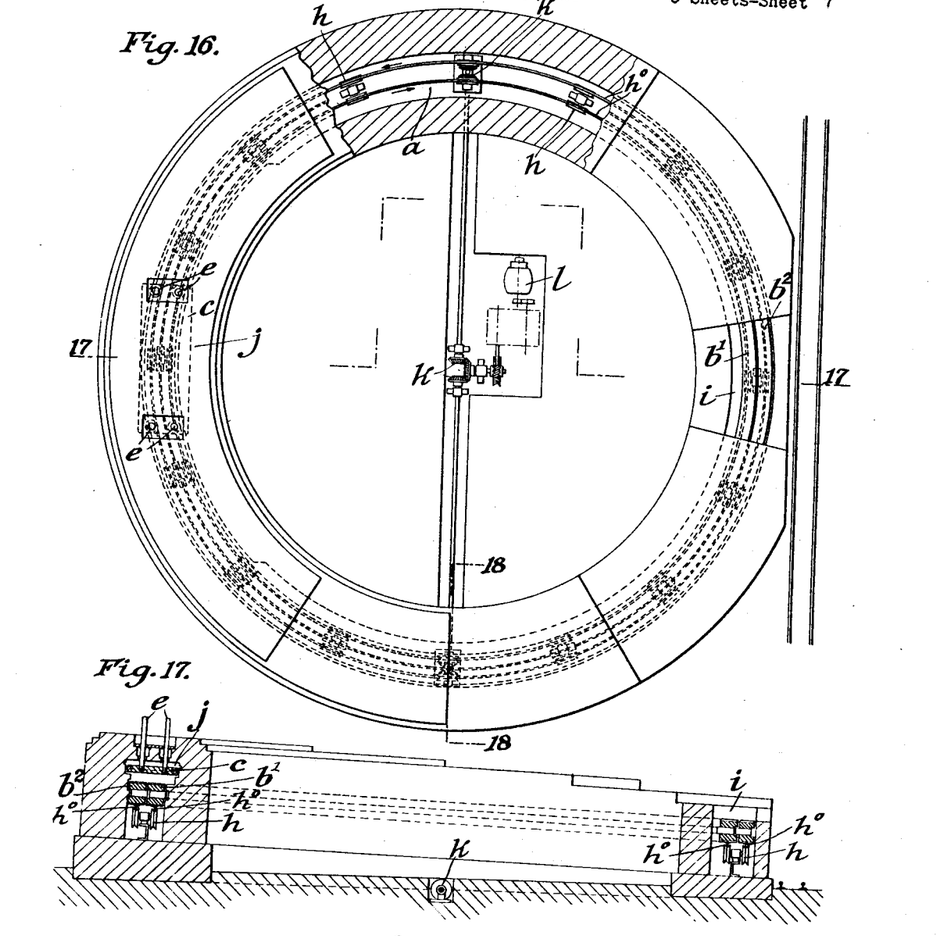
Figure 16 is a sectional plan view of an endless or circular tunnel in accordance with the invention and Figure 17 is a section on the line 17—17, Figure 16.
Figure 18:
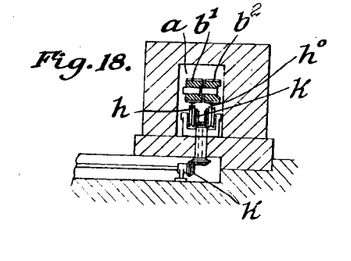
Figure 18 is a section on the line 18—18, Figure 16.

Figures 16 to 18 show the circular form of the improved tunnel kiln employing the concentric annular tables $b^1$, $b^2$ for the goods to be treated, the said tables being rotated in opposite directions around their common axis. The said tables carry on their undersides rails $h^a$ which are supported upon the peripheries of wheels $h$, the axles of which rotate in fixed bearings, the tunnel being left open at the point $i$ most remote from the heating zone $j$, to allow of the treated and untreated goods being, respectively, removed from, and placed in position, on the said tables. The annular tables are rotated around their common axis in opposite directions, through the medium of some of the supporting wheels $h$ which are driven by gearing $k$ from a suitable motor $l$. As shown, the kiln is arranged so that the tunnel, and tables are slightly tilted in order that the hot zone $j$ may be at a slightly higher level than the point $i$ at which the goods are placed in position on the said tables or removed therefrom; or, these positions may be reversed. Or, the kiln and tables may be horizontal.

By employing more than one resistor all working at the same temperature, the hot zone can be lengthened; or, resistors can be placed in any desired portion of the kiln at different temperatures from the hot zone. In the case of firing certain pottery, there is a period of dehydration when the water of combination is driven off at temperatures, say, from 300° to 600° C. to which the ware, if heavy, must be subjected by being moved slowly. In this case, in order that the output of the kiln shall not be reduced by lowering the general speed of travel to that necessary through this particular zone, a fairly long heat zone may be provided at the critical temperature, thereby maintaining the general rate of travel.

Figure 19:
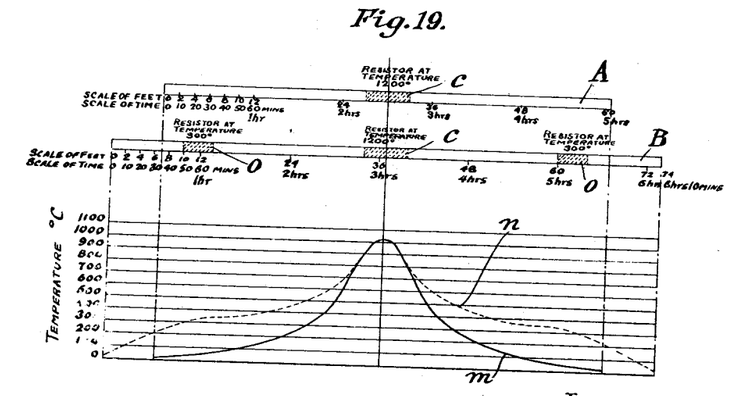
Figure 20:
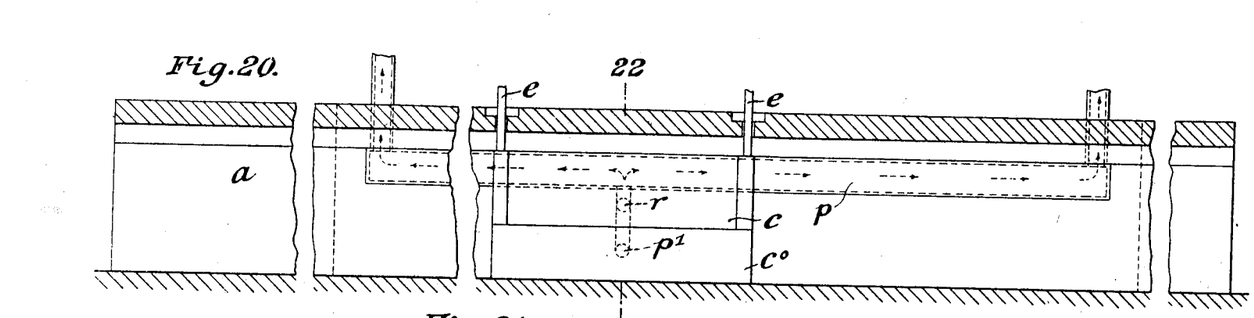
Figures 20 and 21 are, respectively, a longitudinal vertical section and a plan view of a modification of the kiln illustrated in Figures 7 and 8 and shewing the use of an external source of heat.
Figure 21:
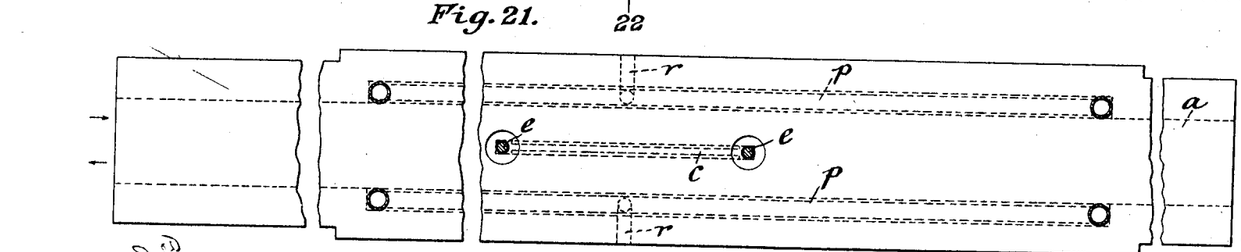
Figure 22:
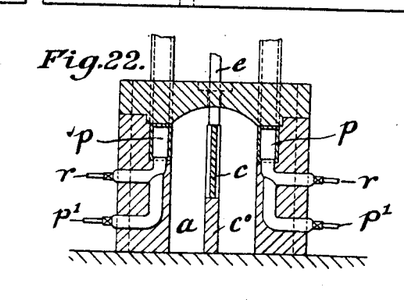
Figure 22 is a transverse section on the line 22—22, Figure 20.
Figure 23:
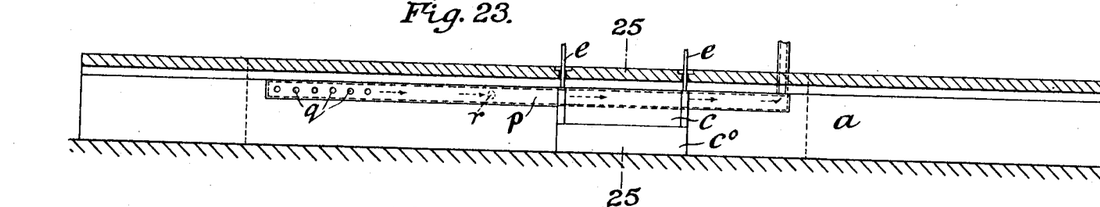
Figures 23 and 24 are, respectively, a longitudinal vertical section and a plan view of another modification of the kiln illustrated in Figures 7 and 8 and using the gases given off from the ware as an external source of heat.
Figure 24:
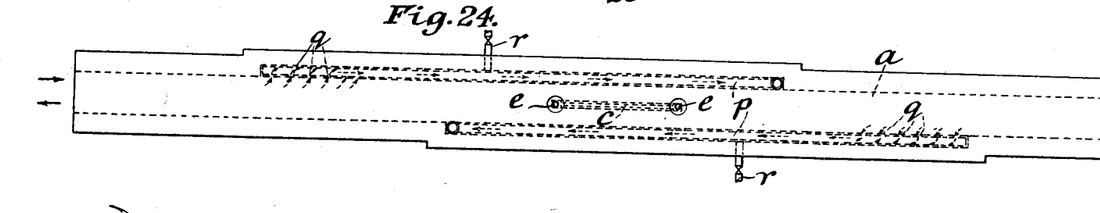
Figure 25:
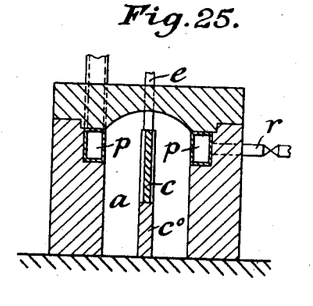
Figure 25 is a transverse section on the line 25—25, Figure 23, but drawn to a larger scale than the latter figure.

Figure 19 is a chart in which the full line curve $m$ shows the rise and fall of temperature in a kiln A glazing cups with only one resistor c at the hot zone, and the dotted line n a curve of temperatures produced in a kiln B by adding resistors o, o at lower temperatures where required.

It is found in practice, that the cost of erecting a kiln of the type described, say, to produce from 4,000 dozen to 5,000 dozen cups per week, together with the necessary electrical controlling gear, is only about one half the cost of erecting any fuel-fired kiln of the same output. Coal and gas fired continuous kilns must be large to obtain their full efficiency; they are therefore difficult to erect on account both of cost and space. The improved kilns can be built in very small units.

In view of the high heat efficiency of the improved kilns the cost of electricity is only slightly greater than the cost of coal, but owing to saving in labour and saggers, and to the improved and even quality of the product and to the saving in rejections, the total cost of production is considerably reduced. The time for the production of any one article is reduced in many cases from days to hours.

The improved type of kiln is, as above described, especially applicable for glazing pottery, but can also be adapted for all similar types of heat treatment and chemical processes.

Figures 20 to 25 illustrate forms of the improved kiln in which loss by radiation of the heat produced electrically for treating the goods in the kiln, is prevented by other forms of heat. In these figures the resistor c (or resistors) is arranged centrally of the tunnel, as in Figures 7 and 8, and the walls are made hollow, or provided with flues p, p, which, in the construction illustrated in Figures 20 to 22, serve for the passage therethrough of flames and for the heated products of the combustion of gas, oil or other combustible introduced at the inlets p¹. In the construction illustrated in Figures 23 to 25 the flues p are arranged to utilize the combustible vapours or the like given off from articles, such, for instance, as carbon brushes for electrical use, during the process of treatment in the kiln, the said vapours being burnt in the said flues. As these products are driven off at temperatures much below the maximum temperature required for their treatment, the flues p are extended to the point in the tunnel at which the said products are given off and provided with the inlet openings q to receive them, the said products being drawn into the said flues either by forced or natural draught and mixed with air and burnt in the region of the hot zone of the kiln. r, r Figures 20 to 25 are inlets for air for supporting combustion of the gases in the flues p.

Claims.

1. A tunnel kiln wherein the firing zone is formed by an electric resistor fixed vertically in the centre of the tunnel so that the heat is radiated equally from both sides on to two streams of articles passing either in the same or opposite directions.

2. The combination with a tunnel kiln in which the firing zone is heated by an electric ceramic resistor or resistors of means for conveying current to the said resistor or resistors, such means consisting of rods of graphite extending through the roof of the tunnel, refractory sleeves suitably glazed enclosing the rods, and metal terminals at the outer ends of the rods to which the leads are connected.

3. A tunnel kiln having a double track through which the trucks or trolleys carrying the goods to be treated travel in opposite directions and in which the heating zone is constituted by an electric resistor or resistors arranged in a vertical plane between the lines of trucks.

4. A tunnel kiln wherein the firing zone is heated by an electric resistor or resistors and means are provided for heating the kiln to prevent loss by radiation of the electrically generated heat.

5. A tunnel kiln as claimed in claim 3, wherein the walls of the tunnel at the heating zone are made hollow or formed with flues for the combustion of materials and thus prevent loss by radiation of the electrically generated heat.

6. A tunnel kiln of circular endless form, a pair of concentric tables therein for supporting the goods to be treated, means for moving the tables in opposite directions and an electric resistor or resistors embodied in the walls of the tunnel to constitute a heating zone.

7. A tunnel kiln as claimed in claim 6, wherein the tunnel and tables are tilted so that the heating zone is higher than other points of the tunnel.

8. A tunnel kiln wherein the firing zone is heated by an electric resistor or resistors and other portions of the tunnel are heated by additional resistors to any required temperature.

9. A tunnel kiln wherein the firing zone is formed by an electric ceramic resistor or resistors fixed vertically in the center of the tunnel so that the heat is radiated equally from both sides on to two streams of articles passing either in the same or opposite directions.

10. A tunnel kiln having a double track through which the trucks or trolleys carrying the goods to be treated travel in opposite directions and in which the heating zone is constituted by an electric ceramic resistor or resistors arranged in a vertical plane between the lines of trucks.

11. A tunnel kiln wherein the firing zone is heated by an electric ceramic resistor or resistors and means are provided for heating the kiln to prevent loss by radiation of the electrically generated heat.

12. A tunnel kiln of circular endless form, a pair of concentric tables therein for supporting the goods to be treated, means for moving the tables in opposite directions and an electric ceramic resistor or resistors embodied in the walls of the tunnel to constitute a heating zone.

13. A tunnel kiln wherein the firing zone is heated by an electric ceramic resistor or resistors and other portions of the tunnel are heated by additional ceramic resistors to any required temperature.

CHARLES WILLIAM SPEIRS